United States Patent
Kim et al.

(10) Patent No.: US 7,450,950 B2
(45) Date of Patent: Nov. 11, 2008

(54) APPARATUS AND METHOD FOR MEASURING AND REPORTING UPLINK LOAD IN A CELLULAR MOBILE COMMUNICATION SYSTEM

(75) Inventors: Tai-Suk Kim, Seoul (KR); Youn-Hyoung Heo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 589 days.

(21) Appl. No.: 11/245,110

(22) Filed: Oct. 7, 2005

(65) Prior Publication Data
US 2006/0079267 A1    Apr. 13, 2006

(30) Foreign Application Priority Data
Oct. 7, 2004   (KR) .................. 10-2004-0079988
Feb. 3, 2005   (KR) .................. 10-2005-0010236

(51) Int. Cl.
*H04Q 7/20*    (2006.01)
(52) U.S. Cl. .............. 455/453; 455/67.11; 455/522
(58) Field of Classification Search .......... 455/522, 455/69, 70, 423–425, 67.11, 67.13, 67.14, 455/453, 561, 263, 115.1, 115.3; 370/328, 370/252, 249, 342
See application file for complete search history.

(56) References Cited

U.S. PATENT DOCUMENTS

| 6,442,398 | B1 * | 8/2002 | Padovani et al. ............. 455/522 |
| 2004/0162101 | A1 | 8/2004 | Kim et al. |
| 2005/0124369 | A1 * | 6/2005 | Attar et al. .................. 455/522 |
| 2006/0045045 | A1 * | 3/2006 | Blessent et al. ............. 370/328 |
| 2007/0270100 | A1 * | 11/2007 | Agrawal et al. .......... 455/67.11 |

FOREIGN PATENT DOCUMENTS

| KR | 10-2004-0085917 | 10/2004 |
| WO | WO 00/33475 | 6/2000 |

\* cited by examiner

*Primary Examiner*—Sujatha Sharma
(74) *Attorney, Agent, or Firm*—Roylance, Abrams, Berdo & Goodman, LLP

(57) ABSTRACT

An apparatus and method for measuring and reporting uplink load in a base station (BS) in a cellular mobile communication system are provided. The BS includes a rise over thermal (ROT) detector for measuring a ROT representing uplink load, and reporting information from which the ROT can be derived to a base station controller (BSC) via a standard interface. The ROT detector measures as background power the received power of the BS for a call-free period, the minimum of received power of the BS, or the minimum of received power of the BS measured for a predetermined time period. Then the ROT can be obtained by subtracting the background power from the received power of the BS.

35 Claims, 8 Drawing Sheets

APPARATUS AND METHOD FOR MEASURING AND REPORTING UPLINK LOAD IN A CELLULAR MOBILE COMMUNICATION SYSTEM

PRIORITY

This application claims the benefit under 35 U.S.C. § 119 (a) of Korean Patent Applications entitled "Apparatus and Method for Measuring and Reporting Uplink Load in a Cellular Mobile Communication System" filed in the Korean Intellectual Property Office on Oct. 7, 2004 and assigned Serial No. 2004-79988, and entitled "Apparatus and Method for Measuring and Reporting Uplink Load in a Cellular Mobile Communication System" filed in the Korean Intellectual Property Office on Feb. 3, 2005 and assigned Serial No. 2005-10236, the entire contents of both which are hereby incorporated by reference.

BACKGROUND OF THE INVENTION

1. Field of the Invention

The present invention relates generally to a cellular mobile communication system. In particular, the application relates to an apparatus and method for measuring and reporting uplink load in a base station (BS).

2. Description of the Related Art

Radio channel resources are occupied during a call connection between a mobile station (MS) and a BS in a mobile communication system. While a wired system provides a dedicated line to a terminal irrespective of whether the dedicated line is now used or not, a wireless system cannot allocate a new call or increase the rate of an on-going call for an MS if all available radio resources of a BS are in use. Allocating a new call or increasing the rate of an on-going call beyond available radio resources seriously affects all MSs communicating with the BS and its adjacent BSs. Therefore, the system manages radio resources by rapidly disconnecting the call or reducing the data rate, and monitoring the radio resources. Aside from call allocation and rate increase, factors such as fading may change the amount of available radio resources. Therefore, it is very important in radio communication technology to detect the status of radio resources and to take a corresponding action.

$2^{nd}$ generation (2G) mobile communication systems focus on voice service. The voice service is provided via a relatively slow traffic channel on both the downlink and the uplink. The downlink refers to a direction from a BS to an MS and the uplink refers to a direction from an MS to a BS. Due to increasing user demands for more services beyond the simple voice service, $3^{rd}$ generation (3G) systems have been developed to additionally provide high-speed data service and international standards have been established for the 3G systems. These 3G systems comprise Code Division Multiple Access 2000 1× (CDMA 2000 1×), 1×Evolution in Data Only (1×EV-DO), 1×Evolution in Data and Voice (1×EV-DV), and Wideband CDMA (WCDMA).

Studies of the uplink in the 3G systems have been voice-oriented. They have been made on call approval control and sector capacity analysis in relation to voice call. As high-speed data service has recently been added to the basic voice service on the uplink, many challenging issues have emerged. First of all, accurately evaluating the current radio resources status, that is, the current load is an increasingly significant concern so as to determine an optimum data rate for a high-speed data service as much as possible without impairing the quality of existing calls, especially voice calls.

In the mobile communication system, sector resources are limited by interference from other sector as well as from users within the same sector. A load-based uplink load measuring method was proposed but this method is limited to measuring only the load from users within the same sector. To solve the problem, a Rise Over Thermal (ROT)-based method has been addressed which reflects load comprising interference and to implement this method, efficient ROT measurement has become an issue. ROT is defined as $$\text{ROT[dB]}=\text{total reception power[dBm]}-(\text{thermal noise power}+\text{external power})[\text{dBm}]). \quad (1)$$

The basic issue of ROT measurement is to measure thermal power and external interference power. Although the total reception power can be measured all the time irrespective of the presence or absence of call, the sum of the thermal power and the external interference power (hereinafter, referred to as background power) can be measured only where no call is placed in the BS and the adjacent BSs.

The CDMA2000 EV-DO system defines a silence period to measure the background power. All MSs discontinue transmissions for the silence period, and the reception power measured for the silence period is the background power. However, other systems than CDMA2000 EV-DO, such as CDMA2000 1×, EV-DV, and WCDMA, do not provide the silence period, that is, the period for which MSs stop their on-going communications. It is not easy to control uplink load by ROT measurement in such systems.

Compared to the CDMA system where a BS itself controls uplink load, a base station controller (BSC) is responsible for control of uplink load and thus a ROT measured by a BS must be reported to the BSC in the WCDMA system. However, the standard interface between the BS and the BSC does not support a ROT field required for controlling the uplink load. It supports only a Received Total Wideband Power field by which the BS reports received power to the BSC. Accordingly, a need exists for a technique of accurately measuring ROT for controlling uplink load and interfacing the ROT measurement to a BSC in a mobile communication system like the WCDMA that does not provide a silence period.

SUMMARY OF THE INVENTION

An object of the present invention is to substantially solve at least the above problems and/or disadvantages and to provide at least the advantages below. Accordingly, an object of the present invention is to provide an apparatus and method for measuring rise over thermal (ROT) for controlling uplink load in a mobile communication system that does not employ a silence period to measure background power.

Another object of the present invention is to provide an apparatus and method for increasing the robustness and accuracy of received power information reported to a BSC and computing ROT based on the received power for controlling uplink load in the BSC.

A further object of the present invention is to provide an apparatus and method for measuring ROT for controlling uplink load and reporting the ROT measurement from a BS to a BSC.

The above objects are achieved by providing an apparatus and method for measuring and reporting uplink load in a base station in a cellular mobile communication system.

According to one aspect of an exemplary embodiment of the present invention, an apparatus is provided for measuring and reporting uplink load in a base station in a cellular mobile communication system. The apparatus comprises a measurement controller for detecting a period for which no call is placed in the base station, or in the base station and adjacent base stations, a background power measurer for receiving total received power of the base station and outputting the total received power for the detected period as background power, and a subtractor for generating a ROT value representing the uplink load by subtracting the background power from the total received power of the base station for a non-detected period.

According to another aspect of an exemplary embodiment of the present invention, an apparatus is provided for measuring and reporting uplink load in a base station in a cellular mobile communication system. The apparatus comprises a measurement controller for determining a measuring period for background power, a background power measurer for receiving total received power of the base station and outputting the total received power for the determined measuring period as background power, and a subtractor for generating a ROT value representing the uplink load by subtracting the background power from the total received power of the base station for a non-measuring period.

According to a further aspect of an exemplary embodiment of the present invention, an apparatus is provided for measuring and reporting uplink load in a base station in a cellular mobile communication system. The apparatus comprises a background power measurer for receiving total received power of the base station and outputting received power received for a current cycle as background power, if the received power of the current cycle is less than stored background power of a previous cycle, and a subtractor for generating a ROT value representing the uplink load by subtracting the background power from the total received power of the base station measured when the received power of the current cycle is equal to or greater than stored background power of the previous cycle.

BRIEF DESCRIPTION OF THE DRAWINGS

The above and other objects, features and advantages of exemplary embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

Exemplary embodiments of the present invention will be described herein below with reference to the accompanying drawings. In the following description, well-known functions or constructions are not described in detail for clarity and conciseness.

The asynchronous WCDMA communication system uses an Enhanced Uplink Dedicated CHannel (E-DCH or EUDCH) to support high-speed packet data service on the uplink. The E-DCH was proposed to improve the performance of uplink packet transmission in asynchronous CDMA communication systems. The E-DCH technology adopts new schemes comprising shorter Transmission Time Interval (TTI) and Node controlled scheduling for uplink channels in addition to existing Adaptive Modulation and Coding (AMC) and Hybrid Automatic Retransmission Request (HARQ) used in High Speed Downlink Packet Access (HSDPA).

Figure 1:
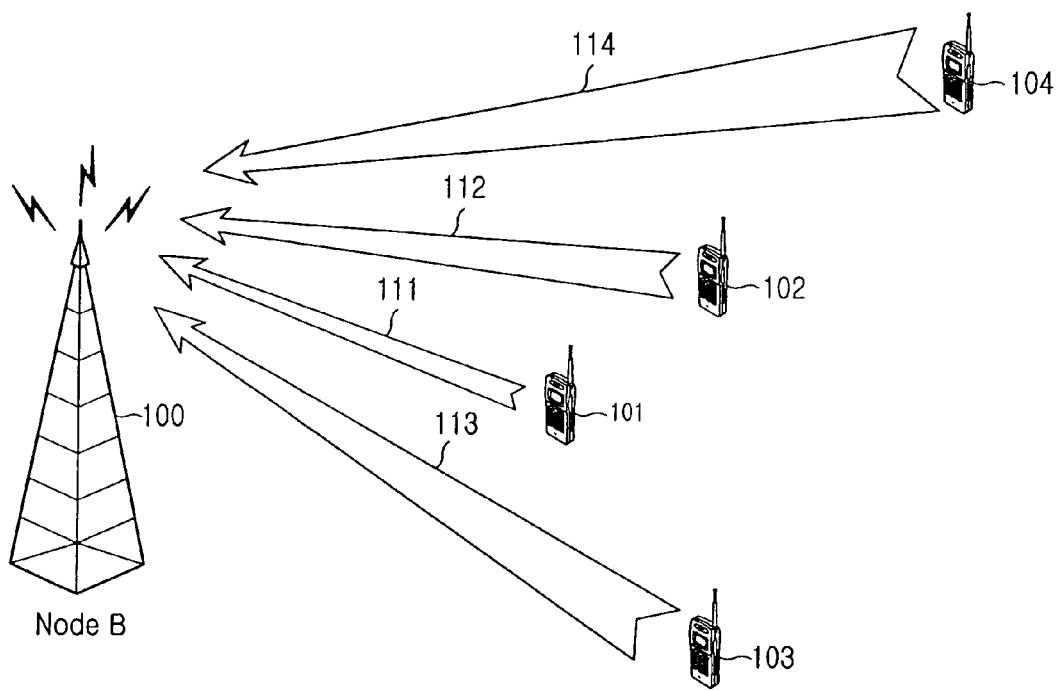
FIG. 1 is a diagram for conceptually illustrating packet data transmission via the Enhanced Uplink Dedicated CHannel (E-DCH) on the radio uplink.

FIG. 1 is a diagram conceptually illustrating packet data transmission via the E-DCH on the radio uplink.

Referring to FIG. 1, reference numeral 100 denotes a Node B for supporting the E-DCH, and reference numerals 101 through 104 denote UEs that transmit the E-DCH. The Node B detects the channel statuses of the UEs 101 through 104 using the E-DCH and schedules data transmission from them based on the channel statuses. The scheduling is performed such that a low data rate is allocated to the remote UE 104 from the Node B 100 and a high data rate to the nearby UE 101, in order to increase the whole system performance.

Because orthogonality is not kept among uplink signals 111 through 114 from the UEs 101 through 104, the uplink signals 111 through 114 interfere with one another. Thus, as more uplink signals are transmitted, interference with an uplink signal from a particular UE increases. Also, as the interference increases, the reception performance of the Node B decreases. Although this problem can be overcome by increasing the uplink transmit power of the UE, the uplink signal from the UE in turn interferes uplink signals from other UEs more seriously. In this context, the Node B limits the total uplink Rise Over Thermal (ROT) to a predetermined target ROT to ensure the reception performance of uplink signals.

Figure 2A:
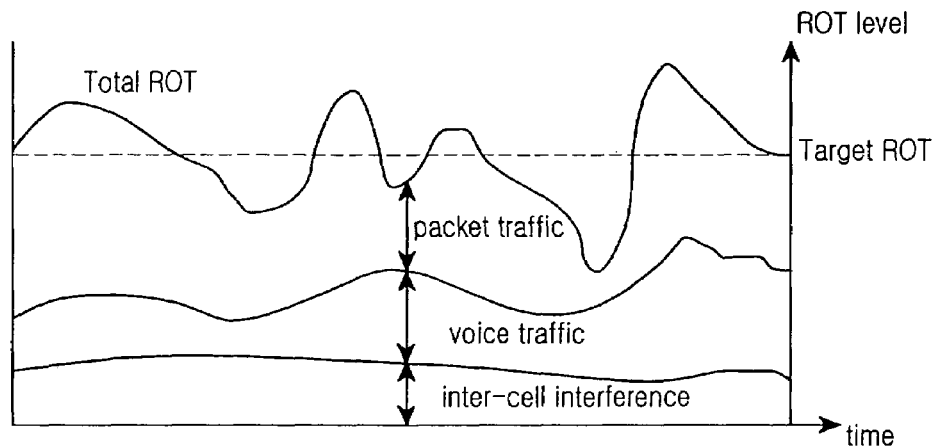
FIGS. 2A and 2B are graphs illustrating changes in uplink (ROT) in a Node B.
Figure 2B:
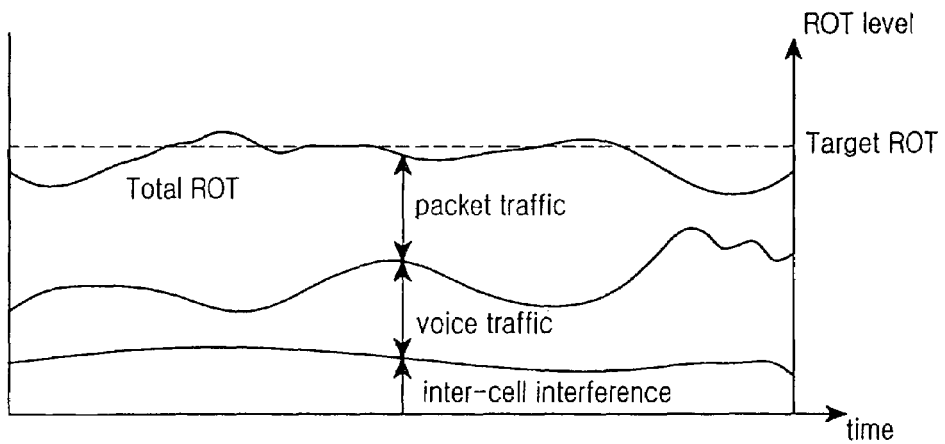

FIGS. 2A and 2B are graphs illustrating changes in uplink ROT in the Node B. As illustrated, the total uplink ROT is a sum of the loads of Inter-Cell Interference (ICI), voice traffic and packet traffic.

FIG. 2A illustrates the change of the total ROT in the Node B when Node B controlled scheduling is not performed. Because the packet traffic is not scheduled, a plurality of UEs can transmit packet data at high rates at the same time, increasing the total ROT beyond a target ROT. As a result, the reception performance of uplink signals is decreased.

FIG. 2B illustrates the change of the total ROT in the Node B when Node B controlled scheduling is performed. The Node B controlled scheduling prevents a plurality of UEs from simultaneously transmitting packet data at high data rates. With the Node B controlled scheduling, if a high data rate is allowed for a particular UE, low data rates are allocated to other UEs in order to maintain the total ROT below the target ROT. In this way, the Node B controlled scheduling constantly ensures the reception performance of the Node B.

Figure 3:
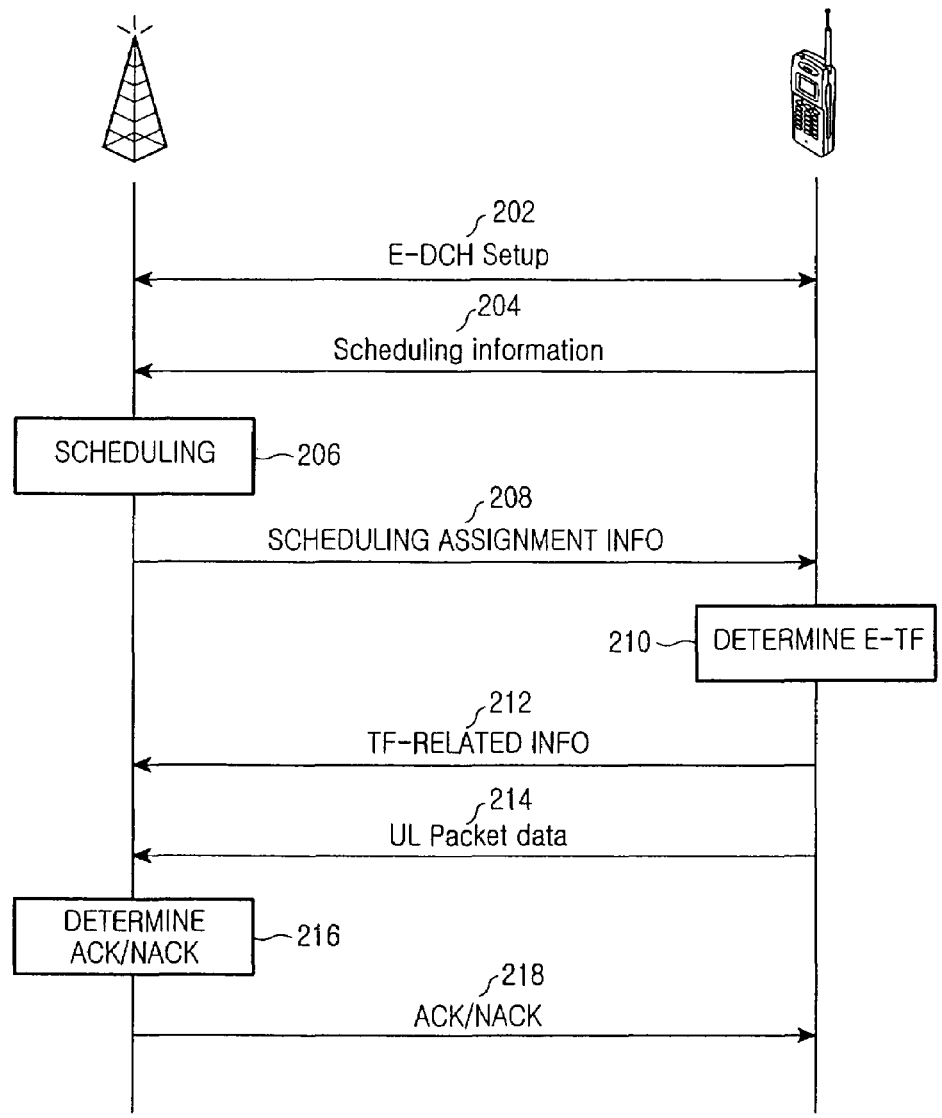
FIG. 3 is a diagram illustrating a signal flow for transmitting uplink packet data from a user equipment (UE) at a data rate allocated by a Node B.

FIG. 3 is a diagram illustrating a signal flow for allocating a data rate for transmission of uplink packet data to a UE by a Node B and transmitting the packet data at the allocated data rate by the UE.

Referring to FIG. 3, the Node B and the UE establish the E-DCH for transmission of uplink packet data in step 202. Step 202 involves transmission of messages on dedicated transport channels. After the E-DCH setup, the UE transmits scheduling information to the Node B in step 204. The scheduling information comprises the transmit power of the UE being uplink channel information, available residual power of the UE, and the amount of data to be transmitted in a buffer of the UE.

Upon receipt of scheduling information from a plurality of UEs communicating with the Node B, the Node B performs Node B controlled scheduling by measuring the total uplink ROT to schedule uplink data transmission from the UEs in step 206. For example, the Node B determines whether the total ROT exceeds a target ROT. If the total ROT is equal to or less than the target ROT, the Node B allows uplink packet transmission from the UE. In step 208, the Node B transmits to the UE scheduling assignment information comprising a maximum allowed uplink rate and an allowed timing.

In step 210, the UE determines the Transport Format (TF) of the E-DCH based on the scheduling assignment information. The UE then transmits packet data on the E-DCH together with the TF information to the Node B in steps 212 and 214. The Node B determines whether errors occur in the TF information and the packet data in step 216. In the presence of errors in either the TF information or the packet data, the Node B transmits a Non-Acknowledge (NACK) signal to the UE in step 218. In the absence of errors in both the TF information and the packet data, the Node B transmits an Acknowledge (ACK) signal to the UE in step 218. Upon receipt of the ACK signal, the UE transmits new user data on the E-DCH, while upon receipt of the NACK signal, it retransmits the same packet data on the E-DCH.

As described earlier, the total ROT in the Node B is the difference between background power and total received power according to Eq. (1). The background power comprises thermal power and external interference power. To measure the background power in a mobile communication system that does not provide a silence period such as WCDMA, the following methods are presented in an exemplary embodiment of the present invention.

Method 1: A ROT detector detects a period for which no call is placed in a Node B and its adjacent Node Bs, and considers the received power in the Node B for the call-free period to be the sum of thermal power and external interference power, that is, background power. The call-free period is notified directly by calls processors of the Node Bs, or through a radio network controller (RNC). It is to be appreciated herein that the call-free period refers to a period for which no call is placed or a period expected to have less calls than a predetermined number of calls.

Method 2: The ROT detector continuously measures the received power of the Node B and the minimum of received power measured up to the moment is considered to be the background power.

Method 3: The ROT detector repeatedly measures the received power of the Node B for a predetermined time period expected to have no calls or less calls than a predetermined number of calls, and the minimum of the measured received power is considered to be the background power. The predetermined time period can be between 1 and 3 o'clock in the morning, for example. It can be set empirically or by a system operator.

Method 4: This method is a modification of Method 2. The ROT detector continuously measures the received power of the Node B and considers the minimum of received power measured for a previous predetermined time period is considered to be the background power. The predetermined time period can be the past 3 days measured from a periodical measuring time or from a measuring time requested by the system operator. It can be set empirically or by the system operator.

The above measuring methods can be used in combination. For example, when the ROT detector detects no calls for a predetermined time period, it determines received power measured for the predetermined time period to be background power. The background power can be measured repeatedly, being updated with a minimum value.

Figure 4A:
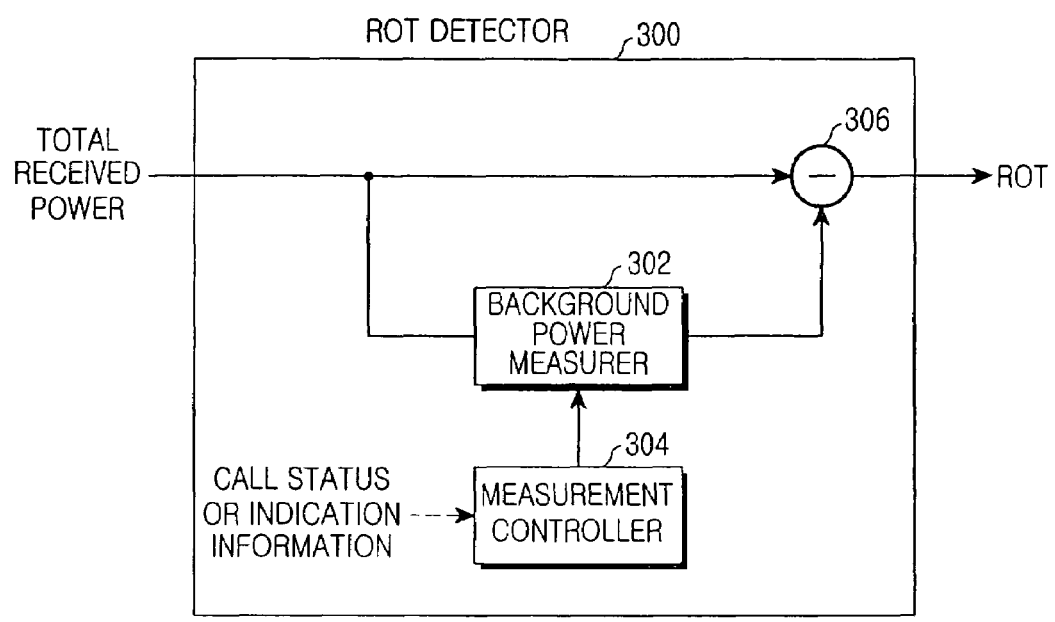
FIG. 4A is a block diagram illustrating a ROT detector according to an exemplary embodiment of the present invention.

FIG. 4A is a block diagram illustrating a ROT detector according to an exemplary embodiment of the present invention. A ROT detector 300 determines a measuring period for background power and measures the background power for the measuring period by using the above Methods alone or in combination.

Referring to FIG. 4A, a measurement controller 304 determines whether a call exists in a Node B of interest, or in the Node B and its adjacent Node Bs. A call processor of the Node B can determine the call status of the Node B. The call statuses of the adjacent Node Bs can be notified by an upper-layer system like a RNC. The reason for referring to the call statuses of the adjacent Node Bs is that the UEs in adjacent Node Bs can interfere the current Node B.

Total received power detected from a receiver antenna is provided to a background power measurer 302 and a subtractor 306. The background power measurer 302 outputs total received power measured for a measuring period which depends on the call statuses as the background power. In non-measuring periods, the background power measurer 302 outputs no background power values. The subtractor 306 subtracts the background power from the total received power in dB and outputs the ROT.

In the case of Method 2, if a received power measurement for a current cycle is less than a stored background power measurement for a previous cycle, the background power measurer 302 outputs the received power of the current cycle as the background power. In Method 3 and Method 4, the measurement controller 304 provides the background power measurer 302 with a detected measuring period or a predetermined time period. The background power measurer 302 outputs the minimum of received power measured for the time periods as the background power.

In an exemplary embodiment of the present invention, a RNC determines the presence or absence of calls in a Node B of interest and its adjacent Node Bs within the coverage of the RNC, and provides the absence of calls or commands measuring of background power when the RNC determines that no calls exist or the background power can be measured in a UMTS system using WCDMA. The Node B then measures the background power in response of a call absence indication message or a background power measure request message received from the RNC via an Iub interface, and calculates the ROT by using the background power measurement.

Figure 4B:
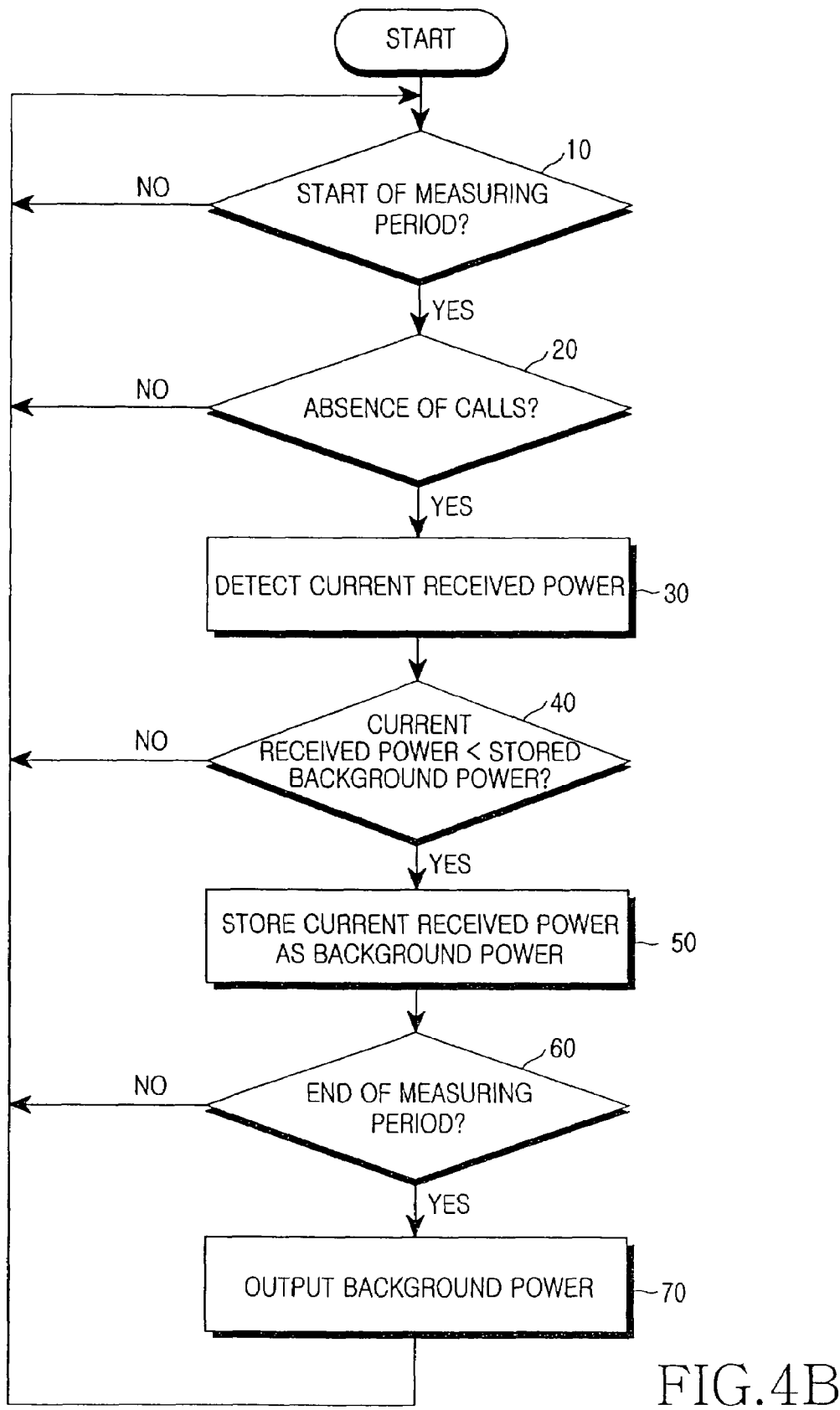
FIG. 4B is a flowchart illustrating a background power measuring operation in the background power measurer according to an exemplary embodiment of the present invention.

FIG. 4B is a flowchart illustrating a ROT measuring operation using the above-described Methods in combination according to an exemplary embodiment of the present invention.

Referring to FIG. 4B, the measurement controller 304 determines whether a predetermined measuring period starts with the current time, for example 1 o'clock in the morning in step 10. If the measuring period starts, the measurement controller 304 determines the call statuses of a Node B of interest and its adjacent Node Bs in the measuring period in step 20. In the absence of calls in the Node Bs, the background power measurer 302 measures the current received power under the control of the measurement controller 304 in step 30. The measurement controller 304 compares the current received power with a stored previous background power measurement under the control of the measurement controller 304 in step 40. If the current received power is less than the previous background power, the measurement controller 304 stores and outputs the current received power as background power in step 50.

The above operation is repeated for the measuring period. In step 60, the measurement controller 304 determines whether the measuring period ends with the current time, for example, 3 o'clock in the morning. If the measuring period expires, the background power measurer 302 finally outputs the stored background power in step 70. In this way, the minimum of received power measured for the measuring period determines the background power.

Meanwhile, in the WCDMA system, the RNC performs a Radio Resource Management (RRM) based on ROT measurements from Node Bs and determines radio resources to be allocated to a new call, that is, time slots and codes for the new call according to the RRM. To do so, the RNC needs to know a ROT measured by the Node B. Hereinbelow, embodiments of a WCDMA system will be described in which a Node B measures a ROT using background power and a RNC acquires the ROT from information reported by the Node B.

Figure 5:
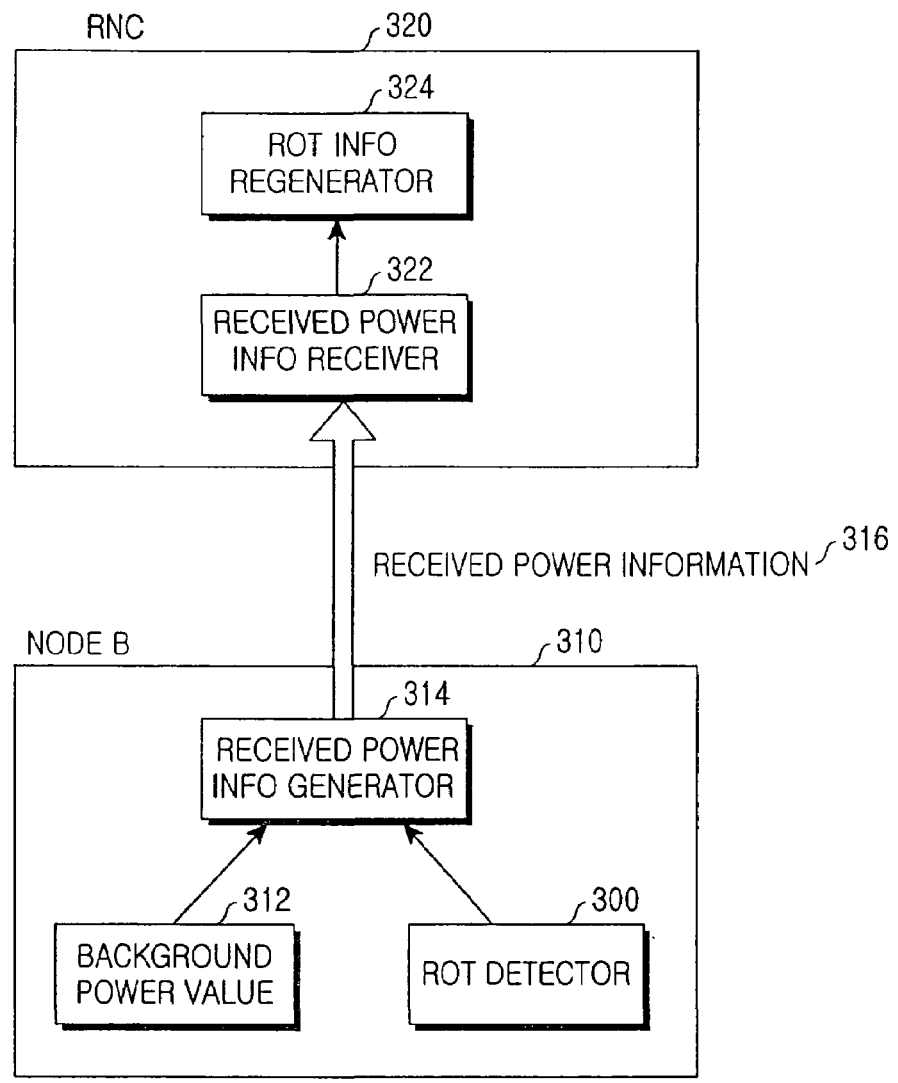
FIG. 5 is a block diagram illustrating a system where a Node B transmits received power information to a radio network controller (RNC) according to an exemplary embodiment of the present invention.

FIG. 5 is a block diagram illustrating a system where a Node B transmits ROT information to a RNC according to an exemplary embodiment of the present invention. Reference numerals 310 and 320 denote a Node B and a RNC that controls the Node B, respectively.

Referring to FIG. 5, the Node B 310 comprises the ROT detector 300 having the configuration illustrated in FIG. 4A. A received power information generator 314 adds a predetermined background power value and a ROT value measured by the ROT detector 300. The sum is a received total wideband power 316 being received power information that the Node B 310 will report to the RNC 320 via the standard interface.

A received power info receiver 322 receives the received power information 316 from the received power info generator 314 via the standard interface between the Node B 310 and the RNC 320. A ROT info regenerator 324 regenerates the ROT information by subtracting the predetermined background power value from the received power information 316. The background power value used in the ROT info regenerator 324 is substantially identical to that used in the Node B 310. The received power and the ROT information is used for received power displaying, open-loop power control, uplink load control, and RRM in the RNC 320.

Since the ROT detector 300 uses the difference between the total received power and the background power in the illustrated case of FIG. 5, the background power measurer 302 only has to provide a relative background power measurement with respect to the total received power. Therefore, the ROT detector 300 is not sensitive to measurement errors caused by the wear-out of the device, defects in a path to a power measuring unit in the Node B, and degradation of an analog measurer. In this case, it is possible to operate the background power measurer 302 in the power measuring unit of the Node B 310, not at an antenna front end. However, since the received power information 316 should be the absolute received power value of a RF reception path in the Node B 310, a more accurate background power value is required.

Thermal power is proportional to an absolute temperature. It is approximately a constant invariant over most temperature ranges. External interference power is produced very rarely. Therefore, the system illustrated in FIG. 5 uses the background power value 312 that can be predetermined for most environments with thermal power only. The background power value 312 is a thermal power value being the product of the Boltzmann constant and an absolute temperature, or a fixed empirical value.

For a Node B environment where external interference power may exist, a real background power measurement is used. A Node B and a RNC using the real background power measurement according to an exemplary embodiment of the present invention are illustrated in FIG. 6.

Figure 6:
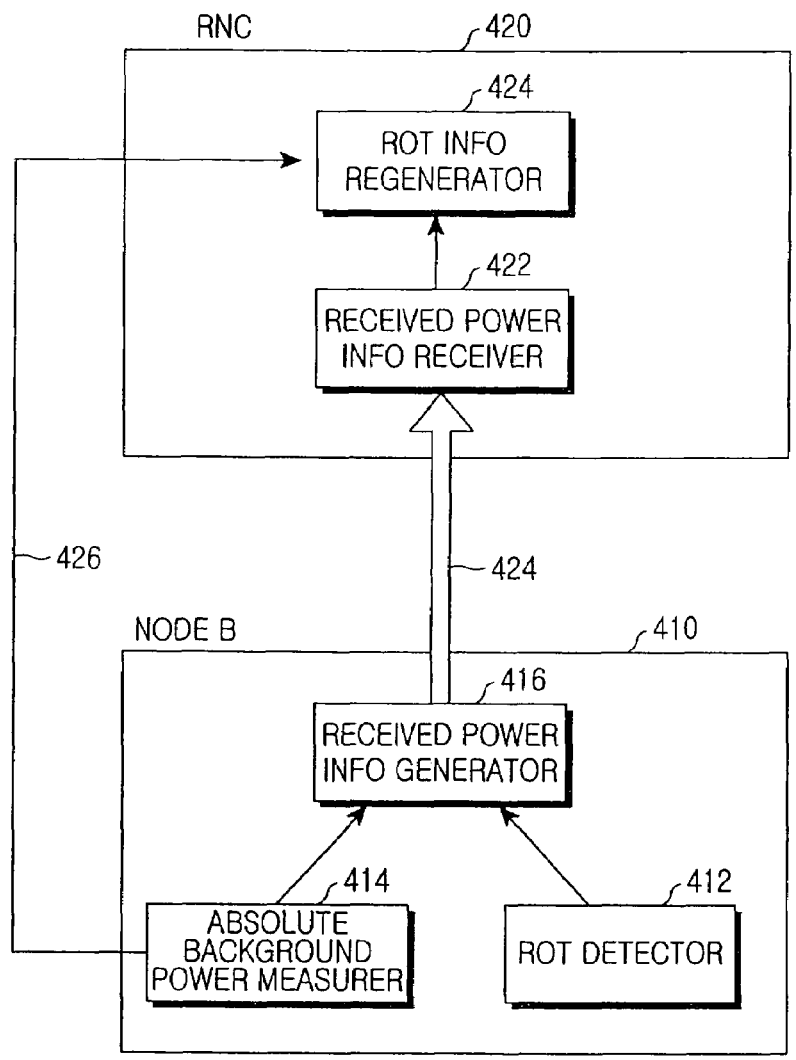
FIG. 6 is a block diagram illustrating a system where a Node B transmits received power information to a RNC according to an exemplary embodiment of the present invention.

Referring to FIG. 6, a Node B 410 comprises a ROT detector 412 configured to use the afore-described Methods alone or in combination. An absolute background noise measurer 414 reports a fixed thermal power value to a RNC 420 in an environment with thermal power only. If other external interference power exists, the absolute background noise measurer 414 reports an accurate background power measured at an antenna front end of the Node B 410 for a call-free period or a predetermined time period. In another case, the absolute background noise measurer 414 reports a thermal power value and a fixed external interference power value to the RNC 420 in an environment with a constant external interference power. Reference numeral 426 denotes a background power value from the absolute background noise measurer 414. The background power value 426 is a fixed value or a real measurement. The background power value 426 can be reported to the RNC 420 via the standard interface or any other interface between the Node B 410 and the RNC 420. A received power info generator 414 adds a ROT value from the ROT detector 300 to the background power value 426 from the absolute background noise measurer 414, thereby creating received power information 424.

A received power info receiver 422 receives the received power information from the received power info generator 416 via the standard interface between the Node B 410 and the RNC 420. A ROT info regenerator 424 regenerates the ROT information by subtracting the background power value 426 reported by the absolute background noise measurer 414 from the received power information 424. The received power and the ROT information is used for received power displaying, open-loop power control, uplink load control, and RRM in the RNC 420.

According to an exemplary embodiment of the present invention as described below, a Node B reports a ROT measurement directly to a RNC via the standard interface or any other interface between the Node B and the RNC.

Figure 7:
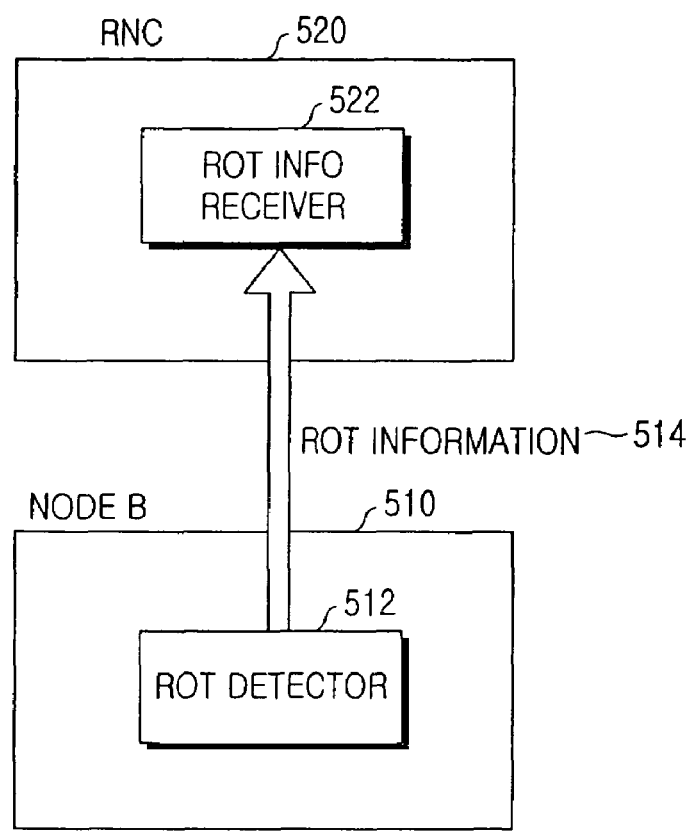
FIG. 7 is a block diagram illustrating a system where a Node B transmits ROT information to a RNC according to an exemplary embodiment of the present invention.

FIG. 7 is a diagram illustrating a Node B and a RNC according to an exemplary embodiment of the present invention.

Referring to FIG. 7, a Node B 510 comprises a ROT detector 512 configured to use the afore-described Methods alone or in combination. ROT information 514 is created suitably for the standard interface between the Node B 510 and a RNC 520 using a ROT measurement from the ROT detector 512 and reported to the RNC 520. A ROT information receiver 522 receives the ROT information 514. The ROT information 514 is used for uplink load control and RRM in the RNC 520.

The exemplary embodiments of the present invention as described above enable the accurate control of uplink load in a mobile communication system that does not provide a silence period by an apparatus for measuring an uplink ROT. Also in a WCDMA system, the exemplary embodiments of the present invention increase the robustness and accuracy of received power information reported to a RNC and provide the RNC with the interface that allows the RNC to calculate a ROT from the reported received power information.

While the exemplary embodiments of the present invention have been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for measuring and reporting uplink load in a base station in a cellular mobile communication system, comprising:
   a measurement controller for detecting a period for which no call is placed in the base station, or in the base station and adjacent base stations;
   a background power measurer for receiving total received power of the base station and outputting the minimum value of the total received power for the detected period as background power; and
   a subtractor for generating a rise over thermal (ROT) value representing the uplink load by subtracting the background power from the total received power of the base station for a non-detected period.

2. The apparatus of claim 1, wherein the measurement controller receives from a base station controller for controlling the base station information indicating the period for which no call is placed in the base station, or in the base station and the adjacent base stations.

3. The apparatus of claim 1, wherein the measurement controller determines whether no call is placed in the base station, or in the base station and the adjacent base stations, for a predetermined time period, and determines to measure the background power in the absence of calls.

4. The apparatus of claim 1, wherein the background power measurer outputs the minimum of the total received power received for the detected period as the background power.

5. The apparatus of claim 1, further comprising a received power info generator for generating received power information by adding the ROT value to a predetermined background power value and reporting the received power information to the base station controller.

6. The apparatus of claim 5, wherein the predetermined background power value is a fixed value representing thermal power in the base station, or a fixed value representing the sum of the thermal power and external interference power.

7. The apparatus of claim 5, wherein the predetermined background power value is a background power value measured by the background power measurer.

8. The apparatus of claim 5, wherein the base station reports the predetermined background power value to the base station controller.

9. The apparatus of claim 1, wherein the base station reports the ROT value directly to the base station controller.

10. An apparatus for measuring and reporting uplink load in a base station in a cellular mobile communication system, comprising:
    a measurement controller for determining a measuring period for background power;
    a background power measurer for receiving total received power of the base station and outputting the minimum value of the total received power for the determined measuring period as background power; and
    a subtractor for generating a rise over thermal (ROT) value representing the uplink load by subtracting the background power from the total received power of the base station for a non-measuring period.

11. The apparatus of claim 10, wherein the measuring period is a period for which no call is placed in the base station and adjacent base stations or a period expected to have-less calls than a predetermined number of calls.

12. The apparatus of claim 10, wherein the measuring period is a predetermined time period before measuring of the background power is requested.

13. The apparatus of claim 10, wherein the measuring period is indicated by a base station controller for controlling the base station.

14. The apparatus of claim 10, wherein the background power measurer outputs the minimum of the total received power received for the determined measuring period as the background power.

15. The apparatus of claim 10, further comprising a received power info generator for generating received power information by adding the ROT value to a predetermined background power value and reporting the received power information to the base station controller.

16. The apparatus of claim 15, wherein the predetermined background power value is a fixed value representing thermal power in the base station, or a fixed value representing the sum of the thermal power and external interference power.

17. The apparatus of claim 15, wherein the predetermined background power value is a background power value measured by the background power measurer.

18. The apparatus of claim 15, wherein the base station reports the predetermined background power value to the base station controller.

19. The apparatus of claim 10, wherein the base station reports the ROT value directly to the base station controller.

20. An apparatus for measuring and reporting uplink load in a base station in a cellular mobile communication system, comprising:
    a background power measurer for receiving total received power of the base station and outputting the minimum value of the total received power received for a current cycle as background power, if the received power of the current cycle is less than stored background power of a previous cycle; and
    a subtractor for generating a rise over thermal (ROT) value representing the uplink load by subtracting the background power from the total received power of the base station measured when the received power of the current cycle is equal to or greater than stored background power of the previous cycle.

21. The apparatus of claim 20, further comprising a received power info generator for generating received power information by adding the ROT value to a predetermined background power value and reporting the received power information to a base station controller for controlling the base station.

22. The apparatus of claim 21, wherein the predetermined background power value is a fixed value representing thermal power in the base station, or a fixed value representing the sum of the thermal power and external interference power.

23. The apparatus of claim 21, wherein the predetermined background power value is a background power value measured by the background power measurer.

24. The apparatus of claim 21, wherein the base station reports the predetermined background power value to the base station controller.

25. The apparatus of claim 20, wherein the base station reports the ROT value directly to the base station controller.

26. A method of measuring and reporting uplink load in a base station in a cellular mobile communication system, comprising the steps of:

determining a measuring period for background power;

outputting the minimum value of the total received power of the base station received for the determined measuring period as background power; and generating a rise over thermal (ROT) value representing the uplink load by subtracting the background power from the total received power for a non-measuring period.

27. The method of claim 26, wherein the measuring period is a period for which no call is placed in the base station, or in the base station and adjacent base stations.

28. The method of claim 26, wherein the measuring period is a predetermined time period.

29. The method of claim 26, wherein the measuring period is indicated by a base station controller for controlling the base station.

30. The method of claim 26, wherein the background power measurer outputs the minimum of the total received power received for the determined measuring period as the background power.

31. The method of claim 26, further comprising the step of generating received power information by adding the ROT value to a predetermined background power value and reporting the received power information to the base station controller.

32. The method of claim 31, wherein the predetermined background power value is a fixed value representing thermal power in the base station, or a fixed value representing the sum of the thermal power and external interference power.

33. The method of claim 31, wherein the predetermined background power value is the output background power value measured by the background power measurer.

34. The method of claim 31, further comprising the step of reporting the predetermined background power value to the base station controller.

35. The method of claim 26, further comprising the step of reporting the ROT value directly to the base station controller.

* * * * *